United States Patent
Bunker et al.

(10) Patent No.: US 11,127,268 B2
(45) Date of Patent: Sep. 21, 2021

(54) DOORBELL CAMERA PACKAGE DETECTION

(71) Applicant: Vivint, Inc., Provo, UT (US)

(72) Inventors: Brandon Bunker, Highland, UT (US); Rongbin Lanny Lin, Orem, UT (US); Aaron Davis, Peasant Grove, UT (US); Shiwei Liu, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/573,950

(22) Filed: Sep. 17, 2019

(65) Prior Publication Data

US 2020/0082690 A1    Mar. 12, 2020

Related U.S. Application Data

(63) Continuation of application No. 14/575,830, filed on Dec. 18, 2014, now Pat. No. 10,417,883.

(51) Int. Cl.
*G08B 13/196* (2006.01)
*H04N 7/18* (2006.01)

(52) U.S. Cl.
CPC . *G08B 13/19613* (2013.01); *G08B 13/19608* (2013.01); *G08B 13/19652* (2013.01); *H04N 7/186* (2013.01); *G08B 13/19656* (2013.01)

(58) Field of Classification Search
None
See application file for complete search history.

(56) References Cited

U.S. PATENT DOCUMENTS

| | | |
|---|---|---|
| 3,935,994 A | 2/1976 | Darvishian |
| 5,844,599 A | 12/1998 | Hildin |
| 6,462,659 B1 | 10/2002 | Schuette |
| 6,493,022 B1 | 12/2002 | Ho et al. |
| 6,967,575 B1 | 11/2005 | Dohrmann et al. |
| 7,187,279 B2 | 3/2007 | Chung |
| 7,504,942 B2 | 3/2009 | Marman |
| 7,528,722 B2 | 5/2009 | Nelson |
| 7,671,718 B2 | 3/2010 | Turner et al. |
| 7,683,940 B2 | 3/2010 | Fleming |
| 7,765,131 B2 | 7/2010 | Klingenberg et al. |

(Continued)

FOREIGN PATENT DOCUMENTS

| | | |
|---|---|---|
| CN | 1529290 A | 9/2004 |
| JP | 2005294927 A | 10/2005 |

(Continued)

OTHER PUBLICATIONS

WO/2010/020851 english translation; • TESSIER, Cédric et al.; Publication Date Feb. 25, 2010 International Application No. PCT/IB2009/006462 International Filing Date Apr. 8, 2009 (Year: 2010).*

(Continued)

*Primary Examiner* — Nancy Bitar
(74) *Attorney, Agent, or Firm* — Holland & Hart, LLP

(57) ABSTRACT

A method for security and/or automation systems is described. In one embodiment, the method includes identifying image data from a signal, analyzing the image data based at least in part on a first parameter, identifying a presence of an object based at least in part on the analyzing, and detecting an object event based at least in part on the identifying.

19 Claims, 7 Drawing Sheets

(56) References Cited

U.S. PATENT DOCUMENTS

| | | | |
|---|---|---|---|
| 7,847,820 B2 | 12/2010 | Vallone et al. | |
| 7,945,032 B2 | 5/2011 | Elberbaum | |
| 8,054,340 B2 | 11/2011 | Miki et al. | |
| 8,120,459 B2 | 2/2012 | Kwak | |
| 8,139,098 B2 | 3/2012 | Carter | |
| 8,164,452 B2 | 4/2012 | Moses et al. | |
| 8,297,494 B1 | 10/2012 | Davis et al. | |
| 8,350,694 B1 | 1/2013 | Trundle et al. | |
| 8,504,103 B2 | 8/2013 | Ficquette | |
| 8,675,074 B2 | 3/2014 | Salgar et al. | |
| 8,773,499 B2 | 7/2014 | Watson et al. | |
| 8,842,161 B2 | 9/2014 | Feng et al. | |
| 8,937,661 B1 | 1/2015 | Slavin et al. | |
| 9,070,175 B2 | 6/2015 | Hurst | |
| 9,237,330 B2 | 1/2016 | Wang et al. | |
| 9,299,350 B1 | 3/2016 | Dumont et al. | |
| 9,354,794 B2 * | 5/2016 | Kirkby | G06F 3/0488 |
| 9,420,331 B2 * | 8/2016 | Laska | H04N 21/4335 |
| 9,449,229 B1 | 9/2016 | Chaudhry et al. | |
| 9,508,239 B1 | 11/2016 | Harrison et al. | |
| 9,799,183 B2 | 10/2017 | Harrison et al. | |
| 9,990,784 B2 * | 6/2018 | McMahan | G06K 9/00221 |
| 10,217,076 B2 | 2/2019 | Duquene et al. | |
| 10,412,342 B2 * | 9/2019 | Child | H04N 5/23296 |
| 10,417,883 B2 * | 9/2019 | Bunker | G08B 13/19652 |
| 2002/0140814 A1 | 10/2002 | Cohen-Solal et al. | |
| 2004/0080615 A1 | 4/2004 | Klein et al. | |
| 2004/0085205 A1 | 5/2004 | Yeh | |
| 2005/0034420 A1 | 2/2005 | Radlinger et al. | |
| 2005/0104730 A1 | 5/2005 | Yang | |
| 2005/0225637 A1 | 10/2005 | Eghbalian | |
| 2006/0126893 A1 | 6/2006 | Tran et al. | |
| 2007/0103542 A1 | 5/2007 | Carter | |
| 2007/0115390 A1 | 5/2007 | Makara et al. | |
| 2009/0251545 A1 | 10/2009 | Shekarri et al. | |
| 2009/0315712 A1 | 12/2009 | Bloemendaal et al. | |
| 2010/0225455 A1 | 9/2010 | Claiborne et al. | |
| 2010/0238262 A1 | 9/2010 | Kurtz et al. | |
| 2011/0052155 A1 | 3/2011 | Desmarais et al. | |
| 2012/0019674 A1 | 1/2012 | Ohnishi et al. | |
| 2012/0188377 A1 | 7/2012 | Kundu et al. | |
| 2014/0118541 A1 | 5/2014 | Lasko | |
| 2014/0149308 A1 | 5/2014 | Ming | |
| 2014/0267716 A1 | 9/2014 | Child et al. | |
| 2014/0267834 A1 | 9/2014 | Aoki | |
| 2015/0016665 A1 | 1/2015 | Tanner | |
| 2015/0054949 A1 * | 2/2015 | Scalisi | H04N 7/188 348/143 |
| 2015/0112972 A1 | 4/2015 | Petrou et al. | |
| 2015/0145643 A1 * | 5/2015 | Fadell | G08B 27/003 340/5.51 |
| 2015/0146078 A1 | 5/2015 | Aarrestad et al. | |
| 2015/0163463 A1 | 6/2015 | Hwang et al. | |
| 2017/0132888 A1 * | 5/2017 | Conlon | G07C 9/28 |
| 2017/0229071 A1 | 8/2017 | Mcmahan et al. | |
| 2018/0053365 A1 | 2/2018 | Bode et al. | |
| 2018/0261060 A1 * | 9/2018 | Siminoff | G08B 13/19684 |

FOREIGN PATENT DOCUMENTS

| | | |
|---|---|---|
| JP | 2009282954 A | 12/2009 |
| KR | 1020110109147 A | 10/2011 |
| KR | 1020120057779 A | 6/2012 |
| WO | 2016109838 A1 | 7/2016 |

OTHER PUBLICATIONS

Extended European Search Report for EP Application No. 15870894.1, dated Jun. 20, 2018.

PCT International Search Report for International Application No. PCT/US2015/065868, dated Apr. 6, 2016 (3 pp.).

* cited by examiner

DOORBELL CAMERA PACKAGE DETECTION

CROSS REFERENCE

This application is a continuation of U.S. patent application Ser. No. 14/575,830, entitled "DOORBELL CAMERA PACKAGE DETECTION," filed Dec. 18, 2014, the disclosure of which is incorporated herein by this reference in its entirety.

BACKGROUND

The present disclosure relates to security and/or automation systems, and more particularly to the security of packages delivered to or picked up from a premises.

Security and automation systems are widely deployed to provide various types of communication and functional features such as monitoring, communication, notification, and/or others. These systems may be capable of supporting communication with a user through a communication connection or a system management action.

With the advent of the Internet and online shopping has come an increase in the delivery of packages to homes, businesses, schools, etc., and with this increase in package delivery has come an increased opportunity for package theft and notifying users about information related to packages at a premises.

SUMMARY

The systems and methods described herein relate to camera package detection, and in some cases are related to external cameras (e.g., doorbell cameras). A camera may be used to capture one or more images of a premises. Image analysis may be performed on the one or more captured images to identify the presence of an object. The object may be identified as a package based at least in part on the image analysis. Upon identifying the object as a package, the systems and methods may monitor the package for unauthorized interaction.

In one embodiment, the method may include identifying image data from a signal, analyzing the image data based at least in part on a first parameter, identifying a presence of an object based at least in part on the analyzing, and detecting an object event based at least in part on the identifying. The image data may include a first set of image data and a second set of image data, the second set of image data being captured after the first set of image data. The first parameter may include image analysis data to detect at least one of shape, color, texture, material, and reflectivity of the image data. The image data may include at least one of photo data and video data, motion detection data based at least in part on a motion of the object, and/or facial recognition data.

In some embodiments, analyzing the image data may include comparing at least a portion of an earlier set of image data with at least a portion of a later set of image data. Additionally, or alternatively, analyzing the image data may include analyzing at least one subset of the image data. In some cases, the method may include sending a notification to a user based at least in part on the assessing. In some cases, a notification may be sent to a user based at least in part on whether a probability of the object event exceeds a predetermined probability threshold.

In some embodiments, analyzing the image data may be based at least in part on a second parameter. Accordingly, the method may include analyzing a first parameter and analyzing a second parameter in relation to the analysis of the first parameter. In some cases, assessing the probability of the object event may include assessing a first probability of the object event based at least in part on analyzing the image data based at least in part on the first parameter, and assessing a second probability of the object event based at least in part on analyzing the image data based at least in part on the second parameter.

A computing device configured for doorbell camera package detection is also described. The computing device may include a processor and memory in electronic communication with the processor. The memory may store computer executable instructions that when executed by the processor cause the processor to perform the steps of identifying image data from a signal, analyzing the image data based at least in part on a first parameter, identifying a presence of an object based at least in part on the analyzing, and detecting an object event based at least in part on the identifying.

A non-transitory computer-readable storage medium storing computer executable instructions is also described. When the instructions are executed by a processor, the execution of the instructions may cause the processor to perform the steps of identifying image data from a signal, analyzing the image data based at least in part on a first parameter, identifying a presence of an object based at least in part on the analyzing, and detecting an object event based at least in part on the identifying.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
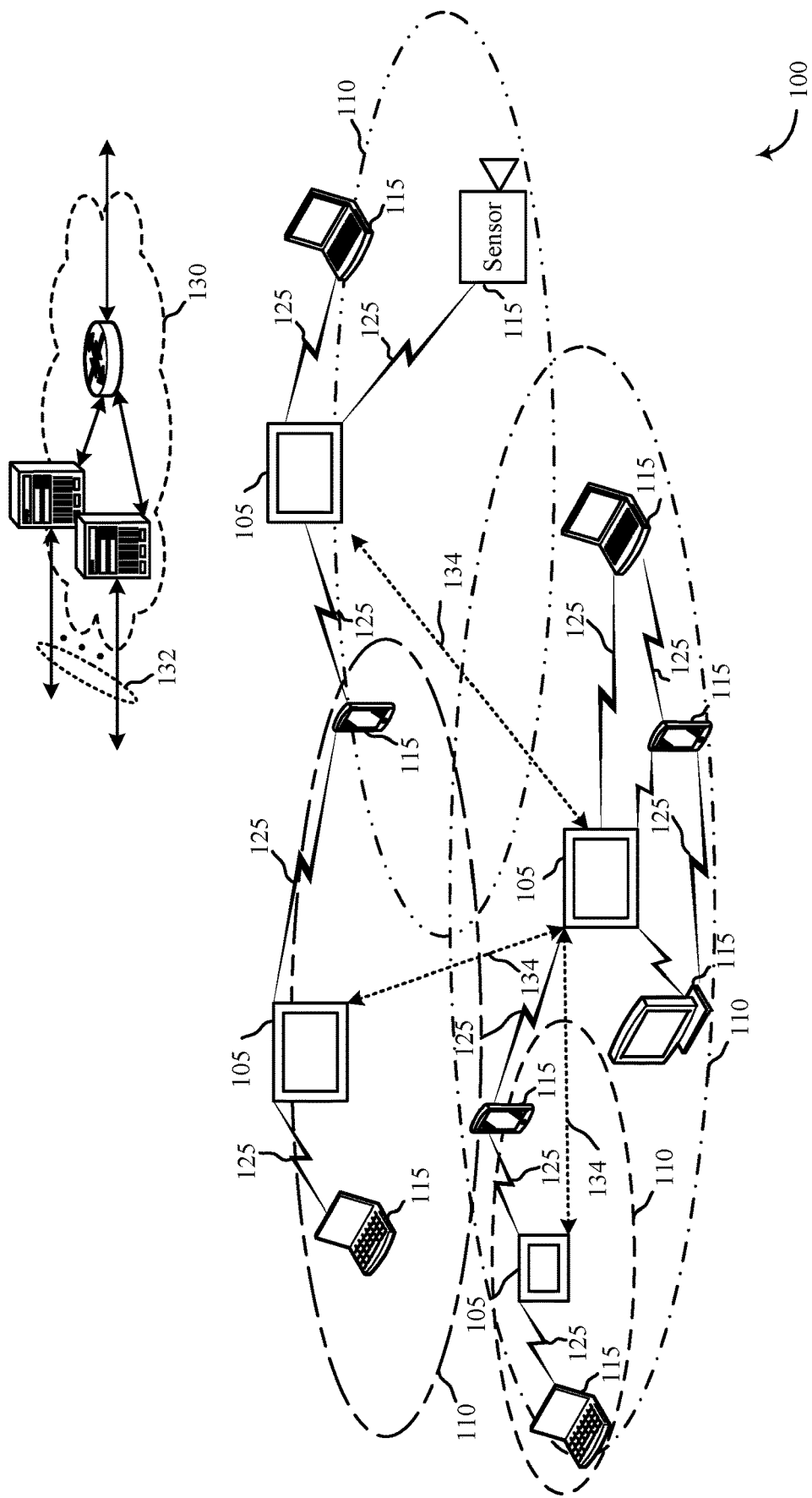
FIG. 1 shows a block diagram relating to a security and/or an automation system, in accordance with various aspects of this disclosure.

The problems solved by the systems and methods described herein include recognizing when certain packages are delivered and/or picked up and identifying information related to the package. Current package delivery/pick-up services are not secure and related package delivery methods include problems such as improper notifications, delayed notifications, theft, and/or failing to notify the user about information related to one or more delivered/picked-up packages (e.g., delivery person, size of the package, timeliness, etc.).

The systems and methods solve these and other problems by using specific visual parameters for detecting information related to packages. In some embodiments, the systems and methods may provide a notification based at least in part on one or more probabilities that may be based at least in part on information related to package delivery/pick-up.

Some embodiments relate to systems, methods, and related devices for detecting information related to one or more packages that are delivered and/or picked up, specifically related to security/home automation systems.

The present systems and methods use computer vision technology (based on a camera) to detect information related to packages, including detecting: a package, a person carrying a package, characteristics related to a person carrying a package (e.g., facial features, uniform, vehicle, etc.), environmental information (e.g., light, weather, etc.), and/or other information.

In some embodiments, the system may detect information about a package including shape, size, color, labeling, material, etc. This may be based at least in part on algorithms related to: image processing techniques, edge detection, segmentation, shape detection, deformable part models, figure detection, background subtraction, object detection, and/or other information. In some embodiments, the detection may occur when a person is walking toward and/or away from an area (e.g., a front door) and/or when a package is left at an area.

The detection may be based on information that the system collects over time. This information may include general parameters, parameters specific to a structure, and/or may be based on one or more areas related areas. For example, the system may perform detection related to a nearby area in view—such as a front porch. The system may learn and/or store data (image, video, etc.) specific to the porch area and then perform a comparison of one piece of porch data (like a picture or a video taken on Nov. 1, 2014 with another piece of porch data (like a picture or a video taken on Nov. 5, 2014) to identify the presence or absence of a package. This learning may occur through image and/or video capturing over a period of time and then the system may compare one or more captured data points with one or more other captured data points. In some embodiments, after some data is captured, the later captured data may include motion-triggered capturing events (i.e., when motion occurs, the system then captures an image and/or a video and can then compare it to the early data set). The system may compare learned data (stored in a device, in a panel, and/or through a wireless cloud network, etc.) with the motion-triggered data.

The system may learn and/or store data relating to (as examples) lighting, texture, reflectivity, color, materials (stone, stucco, cardboard), shape, motion (street traffic, sidewalk traffic, etc.), behavioral patterns, and/or weather, etc. In some embodiments, this learning and/or storing of data may be specific to a structure or a scenario. For example, the system may analyze certain data based on facing a street (having constant movement via traffic), a wooded area (tree movement from wind), lighting conditions (with a western facing home), etc.

In some embodiments, along with the comparison based on the data, the detection may include examining movement related to a package. For example, by comparing porch data, the system may detect a package and it may look at other data indicating motion near the porch or business entrance (e.g., based on timing, proximity motion detection data, etc.) and use this data to aid in detection. The system may also analyze a person's clothing, logo, nametags, clipboards, facial features, and/or mannerisms (gait, posture, etc.).

In some embodiments, using the other additional data may increase a probability and/or a confidence level assessed. For example, identifying a package's presence based on image and/or video data of an area may yield a first probability and/or confidence level. Then, based on additional comparisons, calculations, analysis, identifications, and/or actions, the probability and/or confidence level may increase, stay the same, and/or decrease. For example, the probability may increase based at least in part on motion detection data, person detection data, clothing detection data, shape detection data, and/or uniform detection data, etc.

Based on a package detection, a system may provide a notification to a user and/or to a deliverer. A notification that a package has been delivered, picked up, and/or moved from a location (based at least in part on a probability and/or confidence level) may be sent to a user via text, email, social media, phone call, push notifications, and/or voicemail, etc. In addition, a notification to a user and/or to a deliverer may be based on environmental (e.g., inclement weather) and/or other factors, which may dictate the type of notification and/or influence the probability threshold for a notification (i.e., lower the threshold for any notification or a specific type of notification based on inclement weather).

The system may also help with theft prevention by notifying a user about a package and/or whether another person is approaching a door before and/or after a package has been delivered and/or picked up. In some embodiments, the system may capture detection data related to movement and/or other parameters to assist in determining probabilities related to preventing theft. In addition, in some cases, the system may also sound a visual and/or an audible alarm in response to certain analysis, data, identification, probabilities, and/or object events at least related to a potential theft. In addition, a notification to a delivery person may also be provided. For example, based on identifying that a package is delivered, the system may tell the delivery person to leave the package in a certain location (under a cover based on weather, in a garage, at a side door, with a receptionist, etc.) and/or provide additional instruction.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, modified, and/or combined. Also, features described with respect to some examples may be added, omitted, modified, and/or combined in other examples.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 and may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server—directly and/or indirectly—using one or more communication links.

The control panels 105 may wirelessly communicate with the devices 115 via one or more antennas. For example, the control panels 105 may communicate wirelessly with one or more cameras such as security cameras, doorbell cameras, etc. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a security camera, a doorbell camera, a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A device 115 may also include or be referred to by those skilled in the art as a user device, a sensor, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A device 115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The communications system 100 may be configured to monitor an area outside a door of a home or business. In conjunction with the control panels 105, devices 115, network 130, and communication links 125 and/or 134, the communication system 100 may be configured to detect a package at the area outside the door of the home or business. For example, a doorbell camera (e.g., sensor 115), may be configured to capture one more or more images of the area, and based on the captured one or more images, the communication system 100 may detect a package being delivered to the area, being taken from the area, left at the area, etc. In some cases, the control panels 105 and/or devices 115 may perform image analysis on the one or more captured images to identify the presence of an object, and based on the image analysis, may identify the object as a package. Upon identifying the object as a package, one or more elements of the communication system 100 may be configured to monitor the package to detect events related to the package such as a person detected within view of the package, delivery of the package, pickup of the package, etc.

Figure 2:
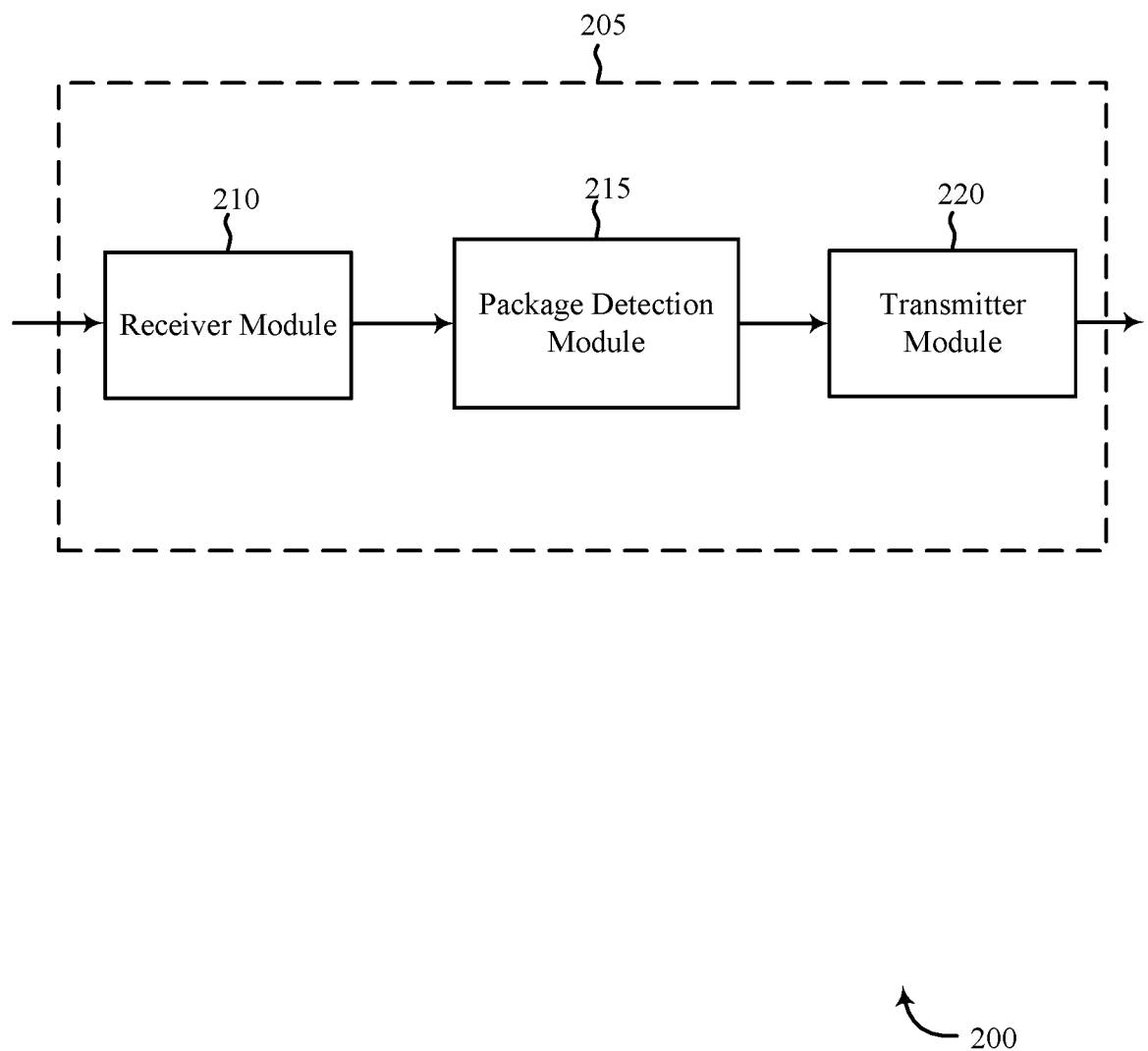
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. In one embodiment, the apparatus 205 may be an example of one or more aspects of a control panel 105 described with reference to FIG. 1. In some embodiments, apparatus 205 may be an example of a security camera such as a doorbell camera, as illustrated by device 115.

The apparatus 205 may include a receiver module 210, a package detection module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data and/or control information from another device such as a control panel, sensor, and/or a camera. Information may be passed on to the package detection module 215, and to other components of the apparatus 205.

Package detection module 215 enables a method for package detection in conjunction with a security and/or automation system. Upon receiving one or more images and/or videos at the receiver module 210, package detection module 215 performs image analysis based at least in part on the one or more images and/or videos to detect a package and/or other feature. Upon detecting a package and/or other feature, the package detection module 215 monitors the package and determines whether a person that is delivering, moving, and/or removing the detected package is authorized to do so. The apparatus 205 may perform various functions based on this analysis and/or determination.

The transmitter module 220 may transmit the one or more signals received from other components of the apparatus 205. The transmitter module 220 may transmit data and/or controls signals to a control panel and/or sensor associated with the security and/or automation system. The data and/or control signals transmitted by the transmitter module 220 may be associated with the image/video analysis and package/feature detection performed by the package detection module 215. In some examples, the transmitter module 220 may be co-located with the receiver module 210 in a transceiver module.

Figure 3:
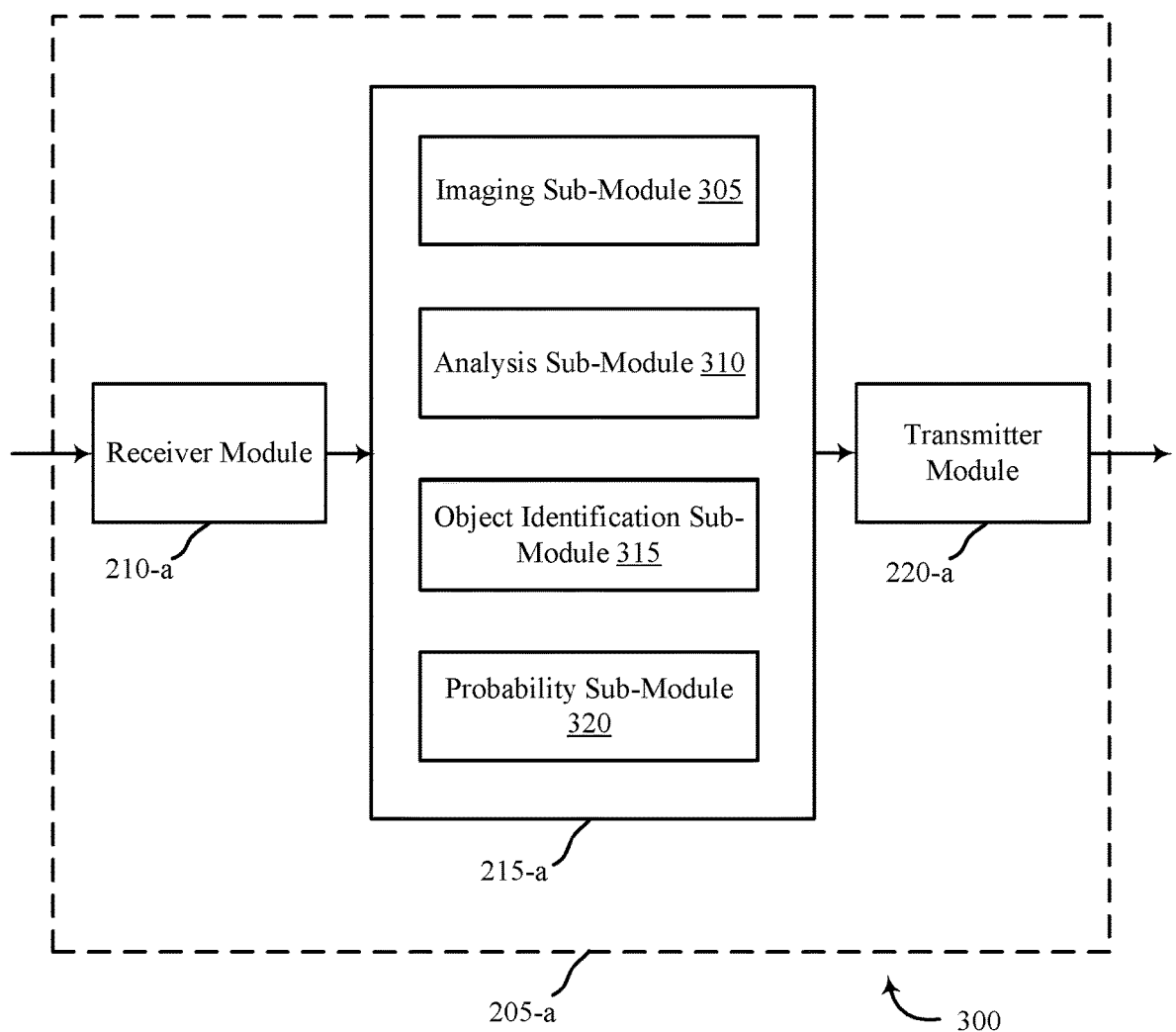
FIG. 3 shows a block diagram of a device relating to a security and/or an automation system, in accordance with various aspects of this disclosure.

FIG. 3 shows a block diagram 300 of an apparatus 205-a for use in wireless communication, in accordance with various examples. The apparatus 205-a may be an example of one or more aspects of a control panel 105 and/or a device 115 described with reference to FIG. 1. It may also be an example of an apparatus 205 described with reference to FIG. 2. The apparatus 205-a may include a receiver module 210-a, a package detection module 215-a, and/or a transmitter module 220-a, which may be examples of the corresponding modules of apparatus 205. The apparatus 205-a may also include a processor. Each of these components may be in communication with each other. The package detection module 215-a may include imaging sub-module 305, analysis sub-module 310, object identification sub-module 315, and probability sub-module 320. The receiver module 210-a and the transmitter module 220-a may perform the functions of the receiver module 210 and the transmitter module 220, of FIG. 2, respectively.

In one embodiment, imaging sub-module 305 may identify image data from a signal. The image data may include at least one of photo data and video data. In some cases, the image data may include data captured within an electromagnetic spectrum such as the visual spectrum, infrared spectrum, etc. For example, imaging sub-module 305 may capture real-time views from a camera sensor of a camera and capture image data from the captured images. For example, the imaging sub-module 305 may capture images from a security camera such as a doorbell camera or other type of camera located at a home, an office, and/or other type of building.

In one embodiment, analysis sub-module 310 may analyze the image data based at least in part on a first parameter. The first parameter may include image analysis data to detect at least one of shape, color, texture, material, and/or reflectivity of the image data, among other things. For example, analysis sub-module 310 may perform image analysis on the image data to detect distinguishable features. In some cases, analysis sub-module 310 may examine one or more pixels of an image to determine whether the one or more pixels includes a feature of interest. In some embodiments, analysis sub-module 310 may detect a face, head, torso, arms, and/or legs of a user in an image. In some embodiments, analysis sub-module 310 may detect features of the user's head and/or face. In some embodiments, analysis sub-module 310 may detect an edge, corner, interest point, blob, and/or ridge in a captured image. An edge may be points of an image where there is a boundary (or an edge) between two image regions, or a set of points in the image which have a relatively strong gradient magnitude. Corners and interest points may be used interchangeably. For example, analysis sub-module 310 may detect an edge and/or corner of a box or package. The box or package may be detected on a surface or being carried by a person such as a delivery person. An interest point may refer to a point-like feature in an image, which has a local two dimensional structure. In some embodiments, the analysis sub-module 310 may search for relatively high levels of curvature in an image gradient to detect an interest point and/or corner (e.g., corner of an eye, corner of a mouth). Thus, the analysis sub-module 310 may detect in an image of a user's face the corners of the eyes, eye centers, pupils, eye brows, point of the nose, nostrils, corners of the mouth, lips, center of the mouth, chin, ears, forehead, cheeks, and the like. A blob may include a complementary description of image structures in terms of regions, as opposed to corners that may be point-like in comparison. Thus, in some embodiments, the analysis sub-module 310 may detect a smooth, non-point-like area (i.e., blob) in an image.

Additionally, or alternatively, in some embodiments, the analysis sub-module 310 may detect a ridge of points in the image. In some embodiments, the analysis sub-module 310 may extract a local image patch around a detected feature in order to track the feature in other images such as previously and/or subsequently captured images. Accordingly, the first parameter may include at least one of edge, corner, interest point, blob, ridge, shape, color, texture, material, and/or reflectivity of the image data. In some cases, the first parameter may include a logo, icon, and/or symbol. For example, in some embodiments, analysis sub-module 310 may detect a logo of a shipping company. In some cases, analysis sub-module 310 may detect a shape such as a logo on a surface of a box or package. Additionally, or alternatively, analysis sub-module 310 may detect a logo on a uniform.

In one example, analysis sub-module 310 may detect a UPS® logo on the surface of a package left on a porch, a logo on a uniform of a UPS® delivery person, and/or a logo on a UPS® delivery truck. This detection and related analysis may be performed based at least in part on a communication referencing a remote source having a repository of information such as shapes, logos, colors, tracking numbers, QR codes, bar codes, etc. In some cases, analysis sub-module 310 may analyze the image data based at least in part on a second parameter. Thus, as one example, analysis sub-module 310 may analyze a detected feature associated with a delivery person, uniform or truck as a first parameter (e.g., facial recognition, logo, etc.), and may analyze a detected feature associated with a package as a second parameter (e.g., edge, corner, color, shape, size, logo, etc.). In one embodiment, analysis sub-module 310 may analyze at least one subset of the image data.

In some cases, object identification sub-module 315 may identify a presence of an object based at least in part on the analyzing a captured image to identify image data. For example, based on the detection of an edge, corner, shape, size, and/or logo in a captured image, for example, object identification sub-module 315 may identify the presence of a certain object such as a box or package, a delivery person, and/or a delivery truck. Accordingly, in some cases, the image data may include motion detection data based at least in part on a motion of the detected object, and/or the image data may include facial recognition data. In some cases, the image data may include a first set of image data and a second set of image data. The second set of image data may be visual data captured and/or detected after the first set of image data is captured and/or detected. Alternatively, the second set of image data may be visual data captured and/or detected as a subset of a first set of image data.

In some embodiments, analysis sub-module 310 may compare at least a portion of an earlier set of image data with at least a portion of a later set of image data. For example, in conjunction with a package delivery, analysis sub-module 310 may compare an image of an area of a patio before a package is placed within the area and after the package is placed within the area. Similar for a package pickup, analysis sub-module 310 may compare an image of an area of a patio before the package, placed in the area of the patio, is retrieved and after the package is retrieved. In some cases, analysis sub-module 310 may query an online database to verify a time of delivery and/or pickup. For example, package detection module 215 may be configured to expect a package delivery and/or package pickup. Accordingly, analysis sub-module 310 may query an online database associated with a delivery service such UPS®, FEDEX®, DHL®, a user's email, etc. Thus, upon detecting a package delivery and/or pickup, analysis sub-module 310 may query the online database to determine the status of the delivery or pickup. As one example, analysis sub-module 310 may query the database and determine that the delivery time of a package is at 3:00 P.M. The analysis sub-module 310 may then determine that the analysis of the image data indicates that a package was detected within a predetermined range of the delivery time indicated by the online database (e.g., within 5 minutes). Accordingly, analysis sub-module 310 may confirm that the detected package is associated with the expected delivery.

In one embodiment, probability sub-module 320 may assess a probability of an object event based at least in part on the identifying a presence of an object. In some cases, probability sub-module 320 may assess a probability of an object event based on the identifying a presence of an object satisfying a predetermined threshold. In some embodiments, probability sub-module 320 may assess a first probability of the object event based at least in part on analyzing the image data based at least in part on a first parameter. Additionally, or alternatively, probability sub-module 320 may assess a second probability of the object event based at least in part on analyzing the image data based at least in part on a second parameter. In one embodiment, probability sub-module 320 may extract features such as lines, shapes, color segments, OCR texts, deformed parts, etc., from one or more sampled frames (images) from one or more photos and/or video.

Probability sub-module 320 may make the extract features part of a Bayesian network. Probability sub-module 320 may then compute, for example, the probability of a person with a package present in an image using a Monte Carlo Markov Chain algorithm (MCMC). Additionally, or alternatively, probability sub-module 320 may use a Recursive Bayes Filter to combine probabilities from each sample and compute a joint probability, potentially increasing the accuracy of the probability. In some cases, probability sub-module 320 may incorporate moving patterns in the computation of probability. For example, probability sub-module 320 may detect movement of a package from one image to the next.

Probability sub-module 320 may be included in a computing device such as a desktop or laptop, an automation/security control panel, a remote server, and/or a sensor such as a doorbell camera. The probability sub-module 320 may compute a probability at a sensor, on a computing device, at a control panel, using a network connection, and/or on a remote server. The imaging sub-module 305 may capture one or more images of an object. The analysis sub-module 310 may perform image analysis on the one or more captured images, and the object identification sub-module 315 may identify the object in the one or more captured images. The probability sub-module 320 may then compute a probability that the identified object is a package for delivery and/or pickup, and/or a person or other identifier associated with a delivery, pickup, and/or event. A processor may execute software code in conjunction with the probability sub-module 320 to compute a probability that an object in a captured image is a package. A storage medium and/or memory may store the software code.

Factors that may affect the probability include the availability of image analysis data to detect shape, color, texture, material, and/or reflectivity of the image data, among others. In some cases, probability may depend on the ability of the probability sub-module 320 to detect an edge, corner, interest point, blob, and/or ridge in a captured image. In some embodiments, a user may provide feedback in relation to a probability assessment made by the probability sub-module 320. The user may indicate whether the probability was accurate or not.

For example, the user may verify that the object identified by the object identification sub-module 315 and assessed to be a package by the probability sub-module 320 was indeed a package, a person, etc. The probability sub-module 320 may use the user's feedback to adjust a calculation of a probability. Accordingly, the probability sub-module 320 may learn whether its probability is accurate. In some cases, the probability sub-module 320 may reassess or reanalyze information to update and/or modify a probability and/or assessment that an object event occurred. For example, the probability sub-module 320 may receive information indicating a delivery confirmation. Accordingly, the probability sub-module 320 may reassess the probability that the identified object is a package, increasing or decreasing the calculated probability.

Figure 4:
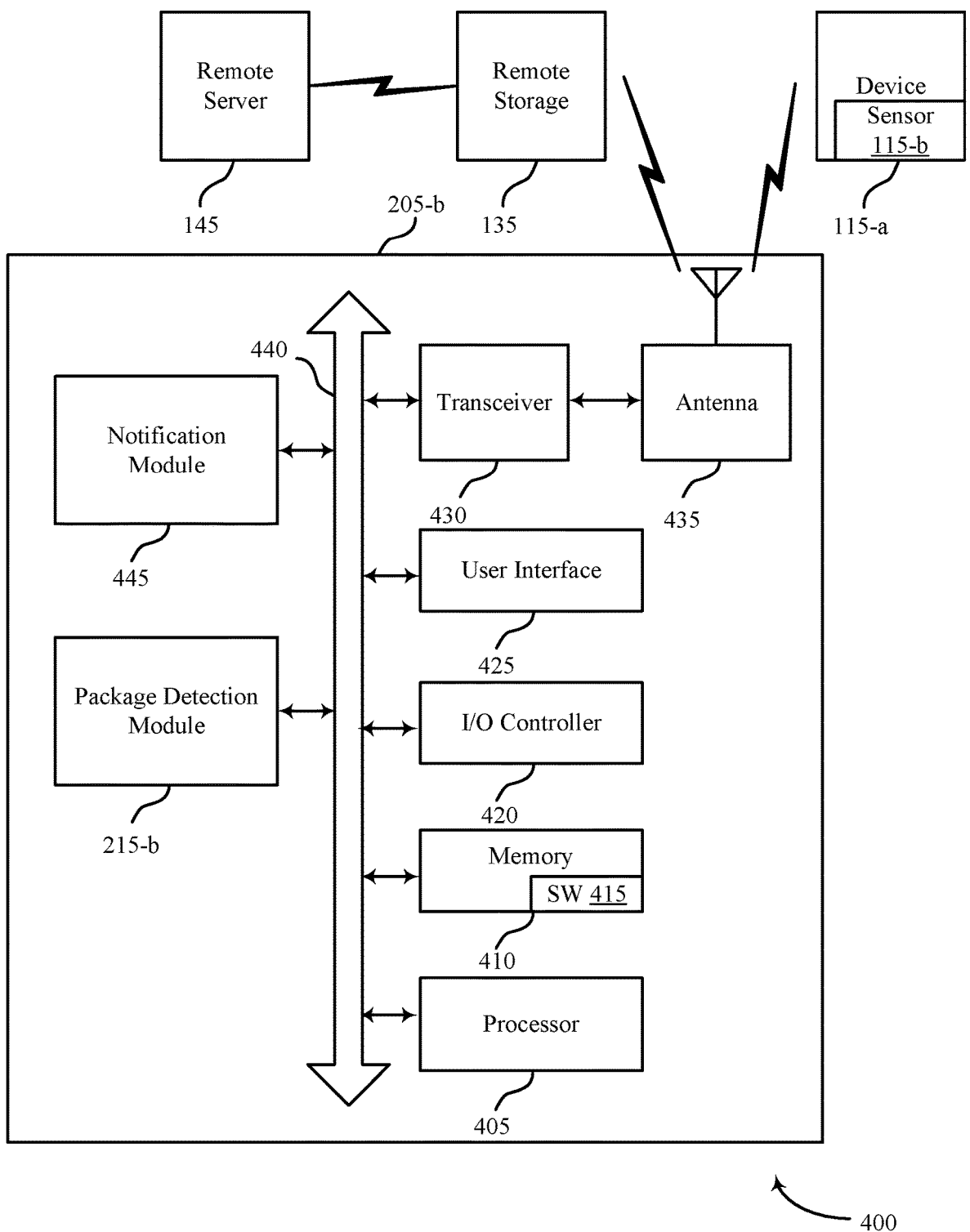
FIG. 4 shows a block diagram relating to a security and/or an automation system, in accordance with various aspects of this disclosure.

FIG. 4 shows a system 400 for use in security and/or automation systems, in accordance with various examples. System 400 may include an apparatus 205-*b*, which may be an example of the control panels 105 of FIG. 1 and/or another device. Apparatus 205-*b* may also be an example of one or more aspects of apparatus 205 of FIGS. 2 and 3 and/or device 115 of FIG. 1. Apparatus 205-*b* may include notification module 445. In some embodiments, the terms a control panel and a control device are used synonymously.

Apparatus 205-*b* may also include components for bi-directional voice and data communications including components for transmitting communications and components for receiving communications. For example, apparatus 205-*b* may communicate bi-directionally with one or more of device 115-*a*, one or more sensors 115-*b*, remote storage 140, and/or remote server 145. This bi-directional communication may be direct (e.g., apparatus 205-*b* communicating directly with remote storage 140) or indirect (e.g., apparatus 205-*b* communicating indirectly with remote server 145 through remote storage 140).

In one embodiment, notification module 445 may send a notification to a user based at least in part on probability sub-module 320 assessing a probability of an object event occurring. For example, notification module 445 may send one or more notifications to one or more users based at least in part on whether the assessed probability exceeds a predetermined probability threshold. In some cases, the probability threshold may be determined in relation to sensor calibration, sensor sensitivity, user preference, past probability calculations, probability feedback loops, image quality, system limitations, etc. Upon determining the probability exceeds the predetermined probability threshold, the notification module 445 may generate a notification. In some cases, the notification may include a text message, an email, a computer generated phone call and/or voicemail, and the like. In some cases, notification module 445 may generate a notification in association with an automation/security system. For example, notification module 445 may generate an audio notification such as a chime and/or a computer-generated voice announcement that is played at a control panel and/or using one or more speakers of the automation/security system. In some cases, notification module 445 may generate an alarm upon certain object events being detected. For example, upon the package detection module 215 detecting a package delivery, notification module 445 may generate an alarm (e.g., via a siren, light, etc.) when the delivered package is detected as being moved or picked up. As one example, package detection module 215 may determine whether a person approaching a delivered package is known or unknown, authorized or unauthorized, etc. For instance, package detection module 215 may use facial recognition, voice recognition, pattern detection/learning, device identification (e.g., detecting an identifier associated with a device carried by a user), etc., to determine whether a person approaching a delivered package is known or unknown. Upon determining the person is unknown and detecting the unknown person taking the package, notification module 445 may sound an alarm. Similarly, package detection module 215 may monitor a package left outside a premises for pickup to determine whether the package is taken by an authorized delivery person or not. A person may be determined to be authorized to interact with the package based on detection of a uniform, delivery truck, company logo, badge or identification, barcode, etc. In some cases, authorization may be determined based on facial recognition, passcode query, and the like. For example, a user approaching the package may be prompted to provide a spoken code or a bade bar code in order to authorize interaction with the package. For example, package detection module 215 may be configured to detect a specified delivery service for delivery or pickup, such as UPS®, FEDEX®, DHL®, etc. Accordingly, package detection module 215 may determine whether the person is wearing a uniform of the expected delivery service, whether the delivery truck is from the expected delivery service, etc. Upon determining a package left for pickup is being taken by an unauthorized person, notification module 445 may sound an alarm.

Apparatus 205-*b* may also include a processor module 405, and memory 410 (including software (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above.

For example, the transceiver module 430 may communicate bi-directionally with one or more of device 115-*a*, remote storage 140, and/or remote server 145. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 145 via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 115-b (e.g., motion, proximity sensor, smoke, glass break, door, window, carbon monoxide, and/or another sensor) may connect to some element of system 400 via a network using one or more wired and/or wireless connections. These one or more sensors 115-b may provide input related to the systems and methods described here, including the sub-modules discussed for package detection module 215-a In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., capturing one or more images, analyzing the images to detect a package, and monitoring the detected package, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the notification module 445 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus 205-b may include a single antenna 435, the apparatus 205-b may have multiple antennas 435 capable of concurrently transmitting and/or receiving multiple wireless transmissions.

The apparatus 205-b may include a package detection module 215-b, which may perform the functions described above for the package detection modules 215 of apparatus 205 of FIGS. 2 and/or 3.

Figure 5:
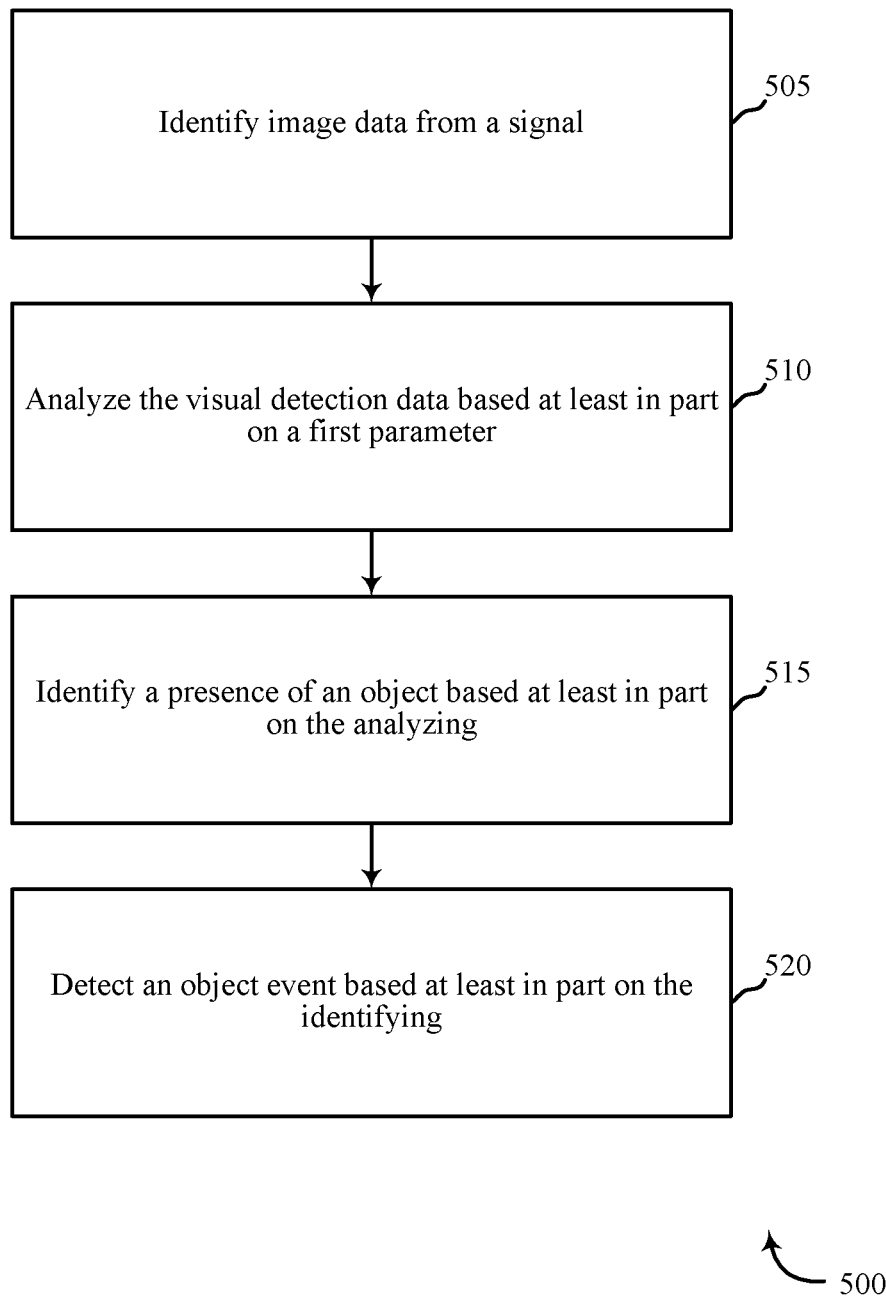
FIG. 5 is a flow chart illustrating an example of a method relating to a security and/or an automation system, in accordance with various aspects of this disclosure.

FIG. 5 is a flow chart illustrating an example of a method 500 for security and/or an automation system, in accordance with various aspects of the present disclosure. For clarity, the method 500 is described below with reference to aspects of one or more of the elements and features described with reference to FIGS. 1 and/or 2, and/or aspects of one or more of the elements and features described with reference to FIGS. 3 and/or 4. In some examples, one or more control panels, backend servers, devices, and/or sensors may execute one or more sets of codes to control the functional elements of the control panels, backend servers, devices, and/or sensors to perform the functions described below. Additionally or alternatively, the control panels, backend servers, devices, and/or sensors may perform one or more of the functions described below using special-purpose hardware. The operation(s) of the method 500 may be performed using the package detection module 215 described with reference to FIGS. 2-4.

At block 505, image data may be identified from a signal. The image data may include at least one of photo data and video data, motion detection data based at least in part on a motion of the object, and/or facial recognition data, among other things. At block 510, the image data may be analyzed based at least in part on a first parameter. The first parameter may include image analysis features (e.g., edge detection, corners, blobs, etc.) to detect at least one of shape, color, texture, material, reflectivity of the image data, etc. In some cases, the analysis may include comparing at least a portion of an earlier set of image data with at least a portion of a later set of image data.

At block 515, a presence of an object may be identified based at least in part on the analyzing. Presence of an object may be detected by detection of an edge, corner, interest point, blob, ridge, shape, color, texture, material, and/or reflectivity relative to the object, among other things. In some cases, the presence of the object may continue to be monitored to determine whether the object remains at the spot where it was initially detected. The continual monitoring may occur via continuous, intermittent, and/or interval detection of an edge, corner, interest point, blob, ridge, shape, color, texture, material, and/or reflectivity relative to the object. At block 520, detect an object event based at least in part on the identifying.

Thus, the method 500 may provide for doorbell camera package detection relating to automation/security systems. It should be noted that the method 500 is just one implementation and that the operations of the method 500 may be rearranged or otherwise modified such that other implementations are possible.

Figure 6:
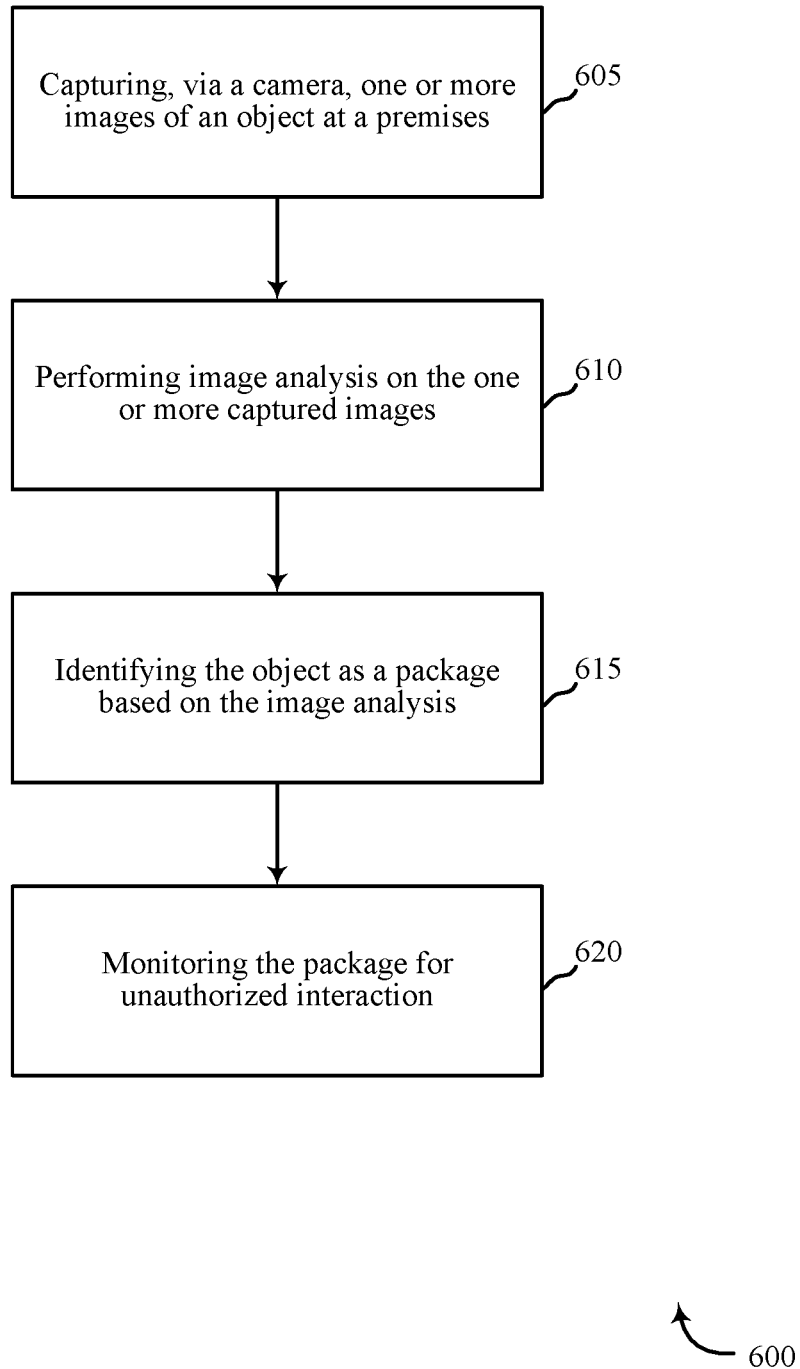
FIG. 6 is a flow chart illustrating an example of a method relating to a security and/or an automation system, in accordance with various aspects of this disclosure.

FIG. 6 is a flow chart illustrating an example of a method 600 for security and/or an automation system, in accordance with various aspects of the present disclosure. For clarity, the method 600 is described below with reference to aspects of one or more of the elements and features described with reference to FIGS. 1 and/or 2, and/or aspects of one or more of the elements and features described with reference to FIGS. 3 and/or 4. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operation(s) of block 605 may be performed using the package detection module 215 described with reference to FIGS. 2-4.

At block 605, one or more images of an object at a premises may be captured via a camera. At block 610, image analysis may be performed on the one or more captured images. In some cases, the analysis may include comparing two or more images captured over a certain time, motion detection, facial recognition, symbol recognition such as detection of a logo of a delivery service, detecting points of interest and tracking them from image to image via cross-correlation, etc. At block 615, the object may be identified as a package based on the image analysis. The package may be associated with a package delivery or a package pickup.

At block 620, the package may be monitored for unauthorized interaction. In some cases, further image analysis may be performed to determine whether a person detected as approaching a package scheduled for pickup is an authorized delivery person of the delivery service associated with the scheduled package pickup. In some cases, the monitoring may include identifying a logo on a uniform, an identification badge, a delivery truck, etc. In some cases, the delivery person may display a badge to a camera. For example, upon detecting a person approaching the package, the package detection module 215 may provide a computer generated or pre-recorded voice prompt that requests the delivery person to display his or her identification card to the camera situated near the package (e.g., a doorbell camera situated at the front door of the premises). In some cases, the package detection module 215 may query an online database to confirm the tracking status of a package (e.g., "delivered," "delivery pending," "out for delivery," "pickup pending," "picked up," etc.). Upon confirming the package delivery and/or package pickup, the notification module 445 may generate a notification. Likewise, upon detecting unauthorized interaction with the package (e.g., someone taking the package), the notification module 445 may generate a notification and/or sound an alarm.

Thus, the method 600 may provide for doorbell camera package detection relating to automation/security systems. It should be noted that the method 600 is just one implementation and that the operations of the method 600 may be rearranged or otherwise modified such that other implementations are possible.

Figure 7:
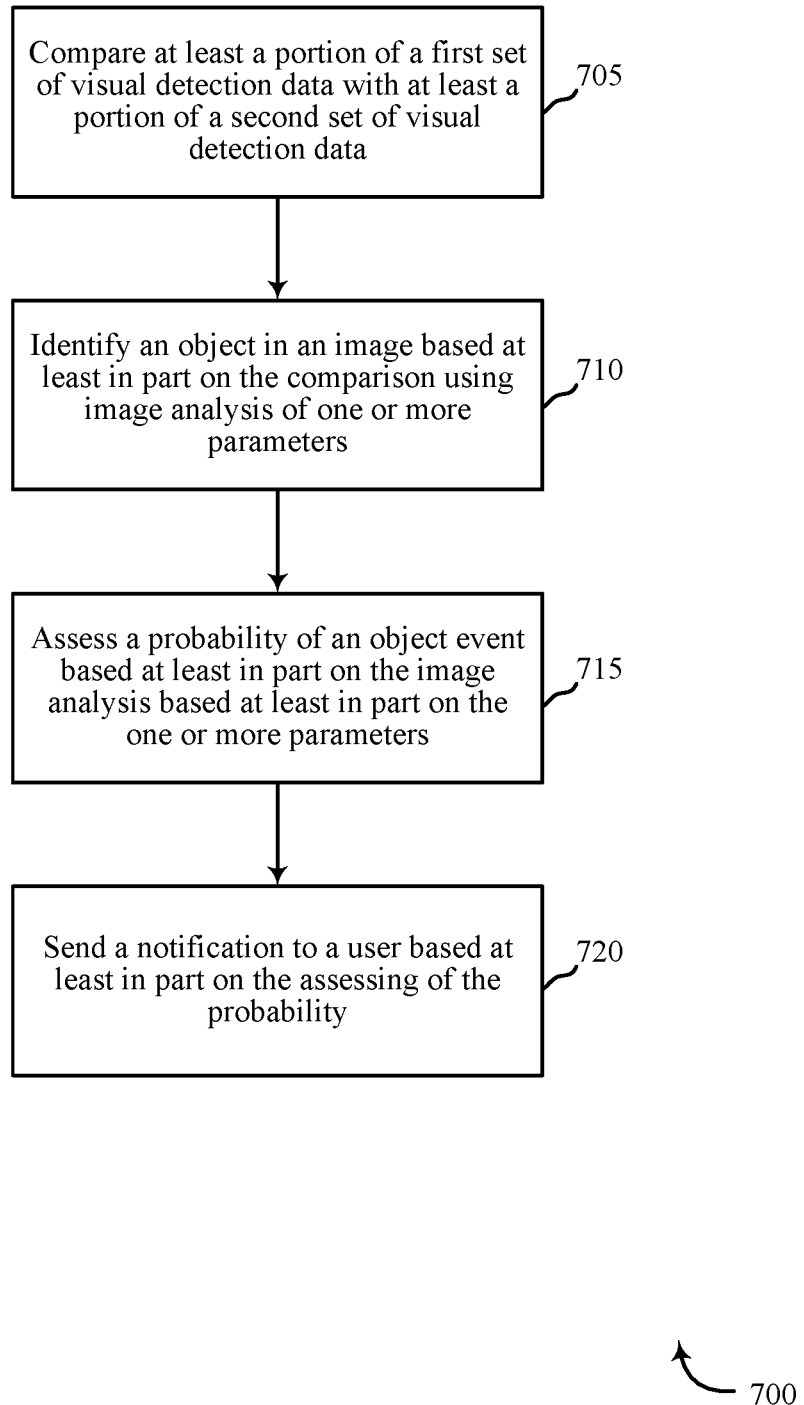
FIG. 7 is a flow chart illustrating an example of a method for security and/or an automation system, in accordance with various aspects of the present disclosure.

FIG. 7 is a flow chart illustrating an example of a method 700 for security and/or an automation system, in accordance with various aspects of the present disclosure. For clarity, the method 700 is described below with reference to aspects of one or more of the elements and features described with reference to FIGS. 1 and/or 2, and/or aspects of one or more of the elements and features described with reference to FIGS. 3 and/or 4. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operation(s) of block 705 may be performed using the package detection module 215 described with reference to FIGS. 2-4.

At block 705, two or more images and/or videos may be captured of an area of a premises to be used as a first set and a second set of image data. The camera, such as a doorbell camera, may be configured to captured images and/or videos of one or more areas of the premises. At least a portion of a first set of image data may be compared with at least a portion of a second set of image data. In some cases, the first set of image data may have been captured before the second set of image data. For example, an earlier captured image may be compared to a later captured image to detect a change between the captured images. The change may indicate the presence of an object within the view of the doorbell camera. At block 710, an object may be identified in an image and/or video based at least in part on image analysis of one or more parameters. Image analysis may be used to detect at least one of edge, corner, interest point, blob, ridge, shape, color, texture, material, and/or reflectivity in relation to the identified object, among other things. At block 715, a probability of an object event may be assessed based at least in part on the image analysis based at least in part on the one or more parameters. The object event may include delivery of a package, pickup of a package, movement of a package, a person carrying a package, etc. At block 720, a notification may be sent to a user based at least in part on the assessing of the probability. In some cases, a notification may be sent based at least in part on whether the probability exceeds a predetermined probability threshold.

Thus, the method 700 may provide for doorbell camera package detection relating to automation/security systems. It should be noted that the method 700 is just one implementation and that the operations of the method 700 may be rearranged or otherwise modified such that other implementations are possible.

In some examples, aspects from the methods 500, 600, and 700 may be combined and/or separated. It should be noted that the methods 500, 600, and 700 are just example implementations, and that the operations of the methods 500, 600, and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and automation system of a premises, comprising:
    monitoring, by an image sensor of the security and automation system, an area of the premises;
    analyzing one or more images captured by the image sensor based at least in part on the monitoring;
    detecting an object within the area of the premises based at least in part on the analyzing of the one or more images;
    analyzing one or more characteristics of the object based at least in part on the detecting of the object;
    computing a probability that the detected object is a package based at least in part on the analyzing of the one or more characteristics of the object;
    determining the probability satisfies a threshold;
    determining the object is a package based at least in part on determining the probability satisfies the threshold;
    querying a database based at least in part on determining the object is a package; and
    identifying package information associated with the premises based at least in part on the querying.

2. The method of claim 1, further comprising:
    sending a notification to a device associated with a user based at least in part on the probability satisfying the threshold.

3. The method of claim 1, further comprising:
    configuring the threshold based at least in part on a calibration of the image sensor, or a sensitivity of the image sensor, or a user profile, or a prior probability calculation, or a probability feedback loop, or a quality of the one or more images, or any combination thereof.

4. The method of claim 1, further comprising:
    detecting a person approaching the object based at least in part on the monitoring;
    analyzing images of the person approaching the object captured by the image sensor based at least in part on the detecting of the person approaching the object; and
    identifying one or more characteristics of the person approaching the object based at least in part on the analyzing.

5. The method of claim 4, wherein the one or more characteristics of the person include at least one of a detected uniform color, or a detected uniform pattern, or a detected company logo, or a detected nametag, or a detected delivery truck, or a detected identification badge, or a detected barcode, or a detected facial feature, or a detected walking pattern, or a spoken passcode, or any combination thereof.

6. The method of claim 4, further comprising:
    adjusting the probability based at least in part on the one or more characteristics of the person.

7. The method of claim 1, further comprising:
    adjusting the probability based at least in part on the package information associated with the premises.

8. The method of claim 1, wherein the package information includes at least one of a delivery time of a scheduled package delivery, or a pickup time of a scheduled package pickup, or a status of the scheduled package delivery, or a status of the scheduled package pickup, or a combination thereof.

9. The method of claim 1, further comprising:
    determining the object is associated with a scheduled package pickup based at least in part on the probability and the identified package information;
    determining the object is being taken by an unauthorized person based at least in part on the one or more characteristics of the person approaching the object; and
    sounding an alarm at the premises based at least in part on determining the object is being taken by the unauthorized person.

10. The method of claim 2, further comprising:
    identifying feedback from the user associated with the notification; and
    adjusting the probability based at least in part on the identified feedback.

11. The method of claim 1, further comprising:
    detecting an environmental condition associated with the premises; and
    increasing or decreasing the threshold based at least in part on the environmental condition associated with the premises.

12. The method of claim 1, wherein the probability is computed by at least one of a processor in a device enclosing the image sensor, or by a processor of a computing device at the premises, or by a processor of a control panel at the premises, or by a processor of a remote server that remote from the premises, or any combination thereof.

13. An apparatus for a security and automation system of a premises, comprising:
    a processor;
    memory in electronic communication with the processor; and
    instructions stored in the memory, the instructions being executable by the processor to:
        monitor, by an image sensor of the security and automation system, an area of the premises;
        analyze one or more images captured by the image sensor based at least in part on the monitoring;
        detect an object within the area of the premises based at least in part on the analyzing of the one or more images;
        analyze one or more characteristics of the object based at least in part on the detecting of the object;
        compute a probability that the detected object is a package based at least in part on the analyzing of the one or more characteristics of the object;
        determine the probability satisfies a threshold;

determine the object is a package based at least in part on determining the probability satisfies the threshold;

query a database based at least in part on determining the object is a package; and identify package information associated with the premises based at least in part on the querying.

14. The apparatus of claim 13, the instructions being executable by the processor to:

send a notification to a device associated with a user based at least in part on the probability satisfying the threshold.

15. The apparatus of claim 13, the instructions being executable by the processor to:

configure the threshold based at least in part on a calibration of the image sensor, or a sensitivity of the image sensor, or a user profile, or a prior probability calculation, or a probability feedback loop, or a quality of the one or more images, or any combination thereof.

16. The apparatus of claim 13, the instructions being executable by the processor to:

detect a person approaching the object based at least in part on the monitoring;

analyze images of the person approaching the object captured by the image sensor based at least in part on the detecting of the person approaching the object; and identify one or more characteristics of the person approaching the object based at least in part on the analyzing.

17. The apparatus of claim 16, wherein the one or more characteristics of the person include at least one of a detected uniform color, or a detected uniform pattern, or a detected company logo, or a detected nametag, or a detected delivery truck, or a detected identification badge, or a detected barcode, or a detected facial feature, or a detected walking pattern, or a spoken passcode, or any combination thereof.

18. A non-transitory computer-readable medium storing computer-executable code for a security and automation system of a premises, the code executable by a processor to:

monitor, by an image sensor of the security and automation system, an area of the premises;

analyze one or more images captured by the image sensor based at least in part on the monitoring;

detect an object within the area of the premises based at least in part on the analyzing of the one or more images;

analyze one or more characteristics of the object based at least in part on the detecting of the object;

compute a probability that the detected object is a package based at least in part on the analyzing of the one or more characteristics of the object;

determine the probability satisfies a threshold;

determine the object is a package based at least in part on determining the probability satisfies the threshold;

query a database based at least in part on determining the object is a package; and identify package information associated with the premises based at least in part on the querying.

19. The non-transitory computer-readable medium of claim 18, the code executable by the processor to:

send a notification to a device associated with a user based at least in part on the probability satisfying the threshold.

* * * * *